(12) United States Patent
Tabata et al.

(10) Patent No.: US 6,417,895 B1
(45) Date of Patent: Jul. 9, 2002

(54) IMAGE DISPLAY DEVICE

(75) Inventors: Seiichiro Tabata, Hino; Kazuya Yamanaka; Kazunari Hanano, both of Hachioji, all of (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/370,660

(22) Filed: Aug. 6, 1999

(30) Foreign Application Priority Data

Aug. 7, 1998 (JP) .......................................... 10-224921

(51) Int. Cl.$^7$ ...................... G02F 1/1333; G02F 1/1335
(52) U.S. Cl. ........................................... 349/15; 349/11
(58) Field of Search ............................... 349/15, 11, 13, 349/96

(56) References Cited

U.S. PATENT DOCUMENTS

| | | | |
|---|---|---|---|
| 4,504,128 A | * 3/1985 | Guilino et al. | 351/167 |
| 4,995,718 A | * 2/1991 | Jacmowicz | 353/31 |
| 5,594,588 A | * 1/1997 | Togino | 359/631 |
| 5,683,161 A | * 11/1997 | Ishikawa et al. | 353/94 |
| 5,842,762 A | * 12/1998 | Clarke | 353/112 |
| 5,966,242 A | * 10/1999 | Yamanaka | 359/618 |

FOREIGN PATENT DOCUMENTS

| | | |
|---|---|---|
| JP | 6-324320 | 11/1994 |
| JP | 9-281430 | 10/1997 |
| JP | 9-325204 | 12/1997 |

* cited by examiner

*Primary Examiner*—William L. Sikes
*Assistant Examiner*—Hoan Nguyen
(74) *Attorney, Agent, or Firm*—Ostrolenk, Faber, Gerb & Soffen, LLP

(57) ABSTRACT

The present invention provides an image display device including an LCD, a polarization switching liquid crystal cell, a birefringent plate, and an eyepiece. The LCD displays an image using a plurality of arrayed pixel locations. The polarization switching liquid crystal cell has a plurality of electrodes incorporated therein and switches the direction of polarization in which light emitted from the LCD is polarized. The birefringent plate varies the optical path of light emitted from the polarization switching liquid crystal cell depending on the direction of polarization. The eyepiece magnifies light representing an image displayed on the LCD. The LCD and polarization switching liquid crystal cell are positioned so that the distance L1 from the eyeballs to the virtual image plane of the LCD and the distance L2 from the eyeballs to the virtual image plane of the polarization switching liquid crystal cell will have the relationship of $1/L2 - 1/L1 \geq 0.4$ D or $L2 \leq 200$ mm. Otherwise, the birefringent plate or the like is coated with an anti-reflective coating. The image display device thus makes unnecessary streaks or flickers indiscernible and displays an easy-to-see image.

8 Claims, 10 Drawing Sheets

FIG.2

3: LCD
4a: ELECTRODE
4: POLARIZATION SWITCHING LIQUID CRYSTAL CELL
4b: LIQUID CRYSTAL
5: BIREFRINGENT PLATE

FIG.3A

ORIGINAL ARRAY OF PIXELS APPEARING ON LCD

FIG.3B

DIRECTION IN WHICH PIXELS ARE DUPLICATED

ARRAY OF PIXELS ON LCD ATTAINE BY PIXEL DUPLICATION

3: LCD
4: POLARIZATION SWITCHING LIQUID CRYSTAL CELL
5: BIREFRINGENT PLATE
6: EYEPIECE
EYEBALL

FIG.10A

DIRECTION OF POLARIZATION

FIG.10B

DIRECTION OF POLARIZATION

FIG.15

IMAGE DISPLAY DEVICE

BACKGROUND OF THE INVENTION

1. Field of the Invention

The present invention relates to an image display device, or more particularly, to an image display device for switching the direction of polarization in which light coming from a display element is polarized so as to increase the number of apparent pixels.

2. Description of the Related Art

In the past, various proposals have been made for an image display device for switching the direction of deflection, in which light coming from a display element is polarized, so as to increase the number of apparent pixels. For example, Japan Unexamined Patent Publication No. 6-324320 describes an image display device to be used with an optical member, which varies an optical path for each field, interposed between the image display device and an observer or screen. A pattern of pixels whose displayed positions are duplicated according to a magnitude by which the optical path is varied for each field is displayed on the image display device.

The image display device is made by arranging an LCD, a polarization switching liquid crystal cell (a plane-of-polarization rotation plate), a birefringent plate, and an eyepiece in that order. The LCD serves as an image display unit. The polarization switching liquid crystal cell, serving as an optical member, has a plurality of electrodes. The birefringent plate refracts light according to the direction of polarization. The eyepiece magnifies an image. The polarization switching liquid crystal cell is used to control the direction of polarization according to the timing of scanning the LCD. The pixels constituting an image to be displayed on the LCD are thus duplicated.

The direction of polarization is controlled according to the timing of scanning the LCD. This is, as described in the above patent publication, because pixels written in an LCD persist over the next field, and information of an odd field and information of an even field therefore coexist in one screen.

Japanese Unexamined Patent Publication No. 9-325204 describes a technology for improving the transmittance of a birefringent plate used as an optical filter. Specifically, the birefringent plate is made from lithium niobate that exhibits a high double refractive index, and is designed thinly. Moreover, the surface of the birefringent plate is coated with an anti-reflective (AR) coating in order to suppress surface reflectance that is more serious than that occurring on a crystal or the like.

Moreover, Japanese Unexamined Patent Publication No. 9-281430 describes a technology according to which a prism realizing an eccentric optical system, being symmetric with respect to a plane, and having a free-form surface is used as an image magnification eyepiece.

However, according to the arrangement described in the Japanese Unexamined Patent Publication No. 6-324320, as described later in conjunction with FIG. 4A, FIG. 4B, and FIG. 5, gaps among the electrodes included in the polarization switching liquid crystal cell are observed as streaks which eventually impair image quality. This has been demonstrated experimentally by the present applicant.

Moreover, when polarized light obliquely enters the birefringent plate, flickers are observed as described later in conjunction with FIG. 10A, FIG. 10B, and FIG. 11. Namely, since the transmittance of the birefringent plate for light varies depending on the relationship between the direction of polarization for the light and the direction of incidence thereof, an amount of transmitted light varies with every switching of the direction of polarization by the polarization switching liquid crystal cell. This has been demonstrated experimentally by the present applicant.

Furthermore, the optical filter described in the Japanese Unexamined Patent Publication No. 9-325204 is used to improve a transmittance for light but is not intended to control the direction of polarization. No mention is made of a means for alleviating occurrence of the foregoing flickers.

There is a demand for an image display device having the structure including the optical system described in Japanese Unexamined Patent Publication No. 9-281430, but without the foregoing drawbacks and enabling saving space.

SUMMARY OF THE INVENTION

One object of the present invention is to provide an image display device capable of displaying an easy-to-see image while making unnecessary streaks or the like indiscernible.

Another object of the present invention is to provide an image display device capable of displaying an easy-to-see image by minimizing occurrence of flickers or the like.

Briefly, according to the present invention, there is provided an image display device including a display element, a polarization control means, an optical path control means, and an optical system. The display element has a plurality of pixel locations arrayed regularly. The polarization control means controls a plurality of electrodes incorporated therein so as to switch the direction of polarization, in which incident light coming from the display element is polarized, in units of a portion composed of electrodes, and then emits resultant light. The optical path control means lies on the optical path of the light emitted from the polarization control means, and varies the optical path according to the direction of polarization. The optical system magnifies light having passed through the optical path control means and representing an image displayed by the display element. The display element and polarization control means are positioned so that: the position of a virtual image stemming from the display element due to the optical system and the position of a virtual image stemming from the electrodes included in the polarization control means will be separated from each other by a distance equal to or longer than a depth of field.

Moreover, according to the present invention, there is provided an image display device including a display element, a polarization control means, an optical path control means, and an optical system. The display element has a plurality of pixel locations arrayed regularly. The polarization control means controls a plurality of electrodes incorporated therein so as to switch the direction of polarization, in which incident light coming from the display element is polarized, in units of a portion composed of electrodes. The optical path control means lies on the optical path of light emitted from the polarization control means, and varies the optical path depending on the direction of polarization. The optical system magnifies light having passed through the optical path control means and representing an image displayed on the display element. The polarization control means is positioned so that the position of a virtual image stemming from the electrodes in the polarization control means will be a closer range than a near point adjustment limit or the shortest distance at which the human eyes can come into focus.

Furthermore, according to the present invention, there is provided an image display device including a display element, a polarization control means, an optical path control means, and an eccentric optical system. The display element has a plurality of pixel locations arrayed regularly. The polarization control means controls a plurality of electrodes incorporated therein so as to switch the direction of polarization, in which incident light coming from the display element is polarized, in units of a portion composed of electrodes. The optical path control means lies on the optical path of light emitted from the polarization control means, and varies the optical path depending on the direction of polarization. The eccentric optical system magnifies light having passed through the optical path control means and representing an image displayed on the display device. The polarization control means is tilted relative to the display element.

According to the present invention, there is provided an image display device including a display element, a polarization switching means, a birefringent optical element, and an optical system. The display element has a plurality of pixel locations arrayed regularly. The polarization switching means switches the direction of polarization, in which incident light coming from the display element is polarized, to two substantially orthogonal directions, and emits resultant light. The birefringent optical element lies on the optical path of light emitted from the polarization switching means, and varies the optical path depending on the direction of polarization. The optical system magnifies light having passed through the birefringent optical element and representing an image displayed on the display element. At least part of the surface of the birefringent optical element is finished so that the ratio of transmittances of polarized light, which is emitted from the polarization switching means and travelling in the two substantially orthogonal directions, will be approximated to 1.

In addition, according to the present invention, there is provided an image display device including a display element, a polarization switching means, a birefringent optical element, and an optical system. The display element has a plurality of pixel locations arrayed regularly. The polarization switching means switches the direction of polarization, in which incident light coming from the display element is polarized, to two substantially orthogonal directions. The birefringent optical element lies on the optical path of light emitted from the polarization switching means and varies the optical path depending on the direction of polarization. The optical system magnifies light having passed through the birefringent optical element and representing an image displayed on the display element. At least part of the surface of the optical system is finished so that the ratio of transmittances of polarized light, which is emitted from the polarization switching means and travelling in the two substantially orthogonal directions, will be approximated to 1.

These objects and advantages of the present invention will become further apparent from the following detailed explanation.

DESCRIPTION OF THE PREFERRED EMBODIMENTS

Referring to the drawings, the embodiments of the present invention will be described below.

Figure 1:
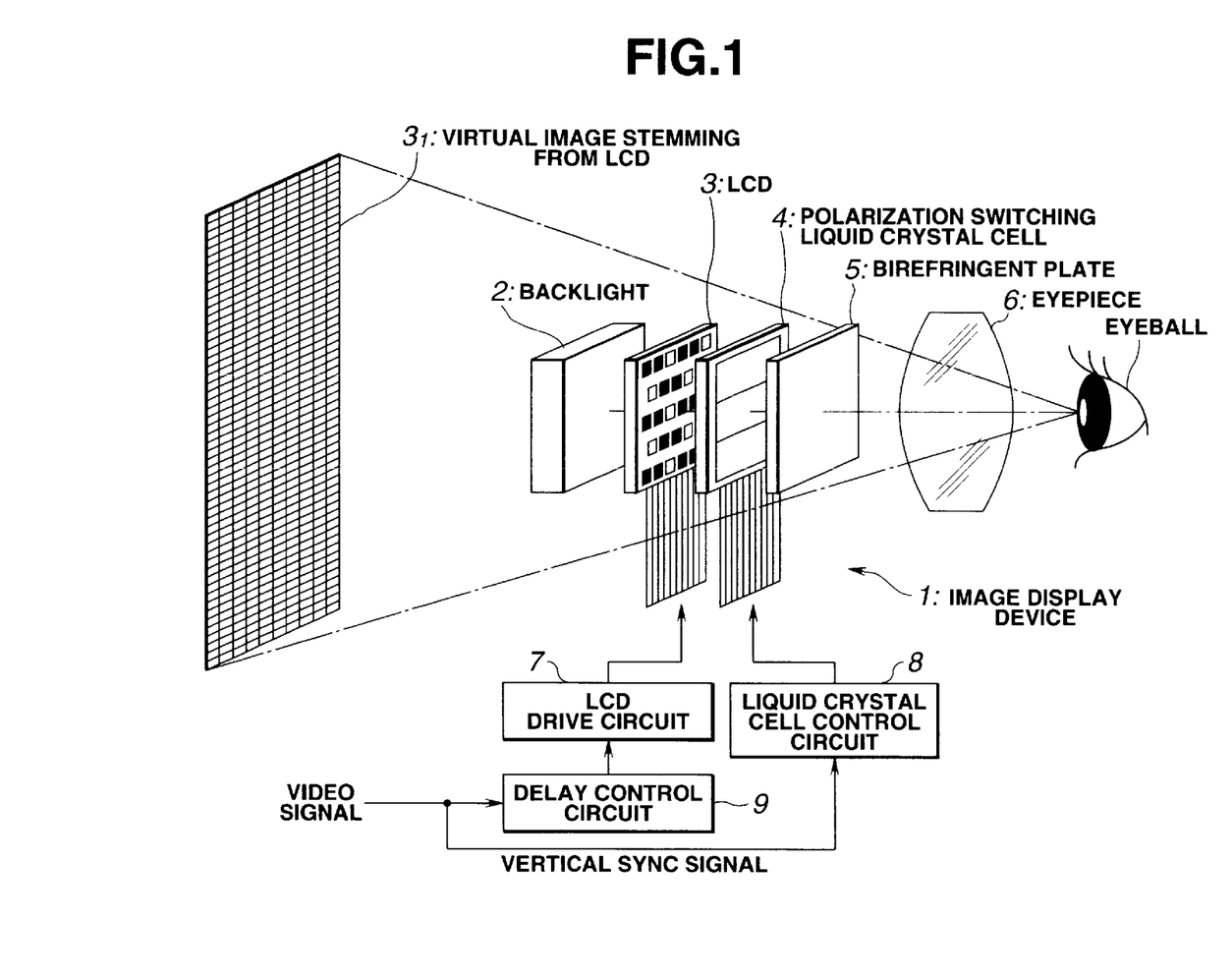
FIG. 1 is a block diagram showing the configuration of a major portion of an image display device in accordance with the first embodiment of the present invention.

FIG. 1 to FIG. 8B relate to the first embodiment of the present invention. FIG. 1 is a block diagram showing the configuration of a major portion of an image display device.

The image display device 1 includes, as shown in FIG. 1, a backlight 2, an LCD 3, a polarization switching liquid crystal cell 4, a birefringent plate 5, and an eyepiece 6. The backlight 2 irradiates illumination light. The LCD 3 serves as a display element to which illumination light is irradiated by the backlight 2 and which emits a beam representing an image displayed using a plurality of pixel locations arrayed regularly. The polarization switching liquid crystal cell 4 time-sequentially polarizes an incident beam, which comes from the LCD 3 and passes through a plurality of portions thereof, in units of a portion, and emits resultant light. The birefringent plate 5 serves as an optical path control means and a birefringent optical element for refracting light, which has passed through the polarization switching liquid crystal cell 4, according to the direction of polarization. The eyepiece 6 is an optical system that magnifies an optical image having passed through the birefringent plate 5 and projects the resultant image on the observer's eyeballs. An image displayed on the LCD 3 is observed as a virtual image 3i by an observer.

When a video signal is supplied, it is converted into a signal, which is suitable for displaying an image field by field with pixels duplicated, by a delay control circuit 9. Thereafter, the video signal is input to an LCD drive circuit 7. The LCD drive circuit 7 drives the LCD 3, whereby an image is displayed.

A vertical sync signal contained in the video signal is input to a liquid crystal cell control circuit 8. The liquid crystal cell control circuit 8 turns on or off a plurality of electrodes 4a, which will be described later, incorporated in the polarization switching liquid crystal cell 4 according to the vertical sync signal. The liquid crystal cell control circuit 8 thus sequentially controls the direction of polarization in which light having passed through each portion composed of electrodes 4a is polarized.

Figure 2:
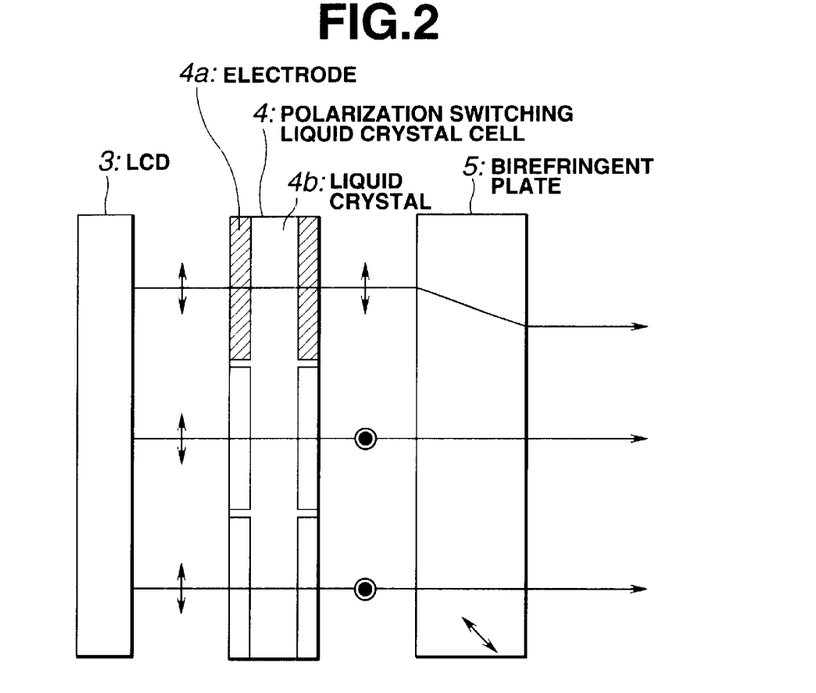
FIG. 2 laterally shows how pixels on an LCD are duplicated by a polarization switching liquid crystal cell and a birefringent plate according to the first embodiment.

FIG. 2 laterally shows how pixels on the LCD 3 are duplicated by the polarization switching liquid crystal cell 4 and birefringent plate 5.

Figure 5:
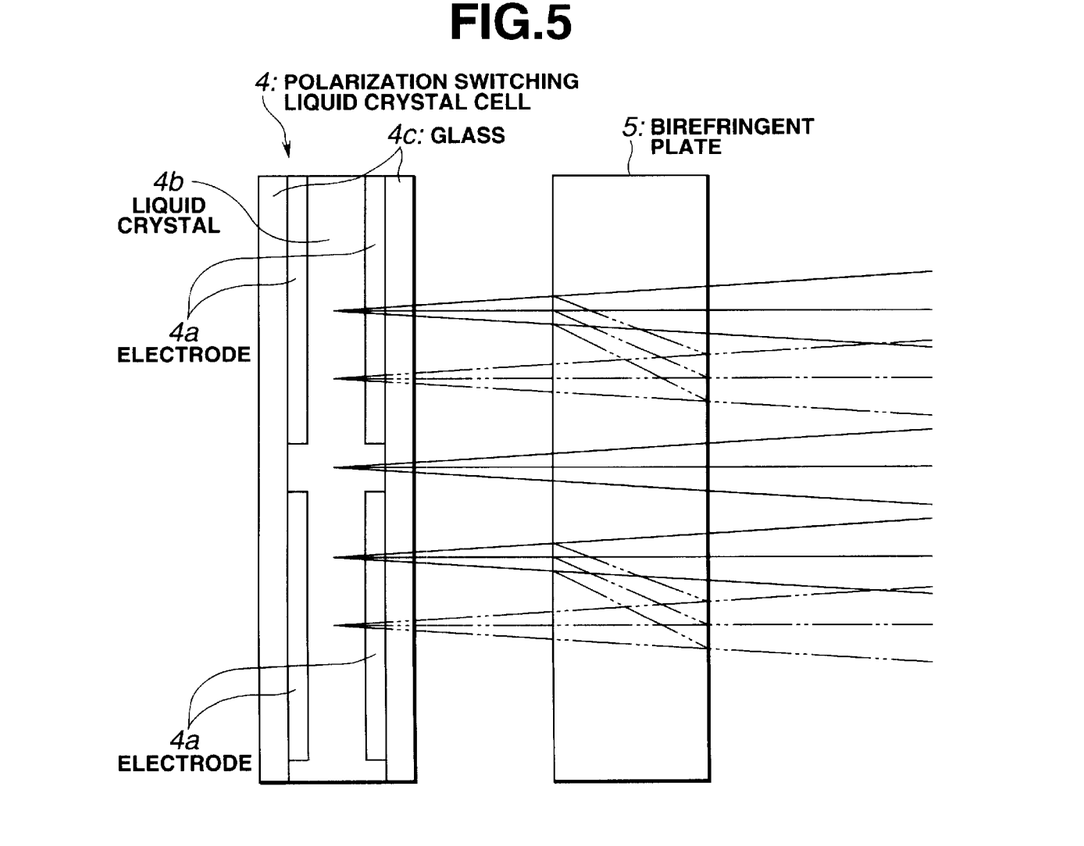
FIG. 5 laterally shows paths along which rays travel after the direction of polarization is switched according to the first embodiment.

The polarization switching liquid crystal cell 4 is, as shown in FIG. 2, made by sandwiching a liquid crystal 4b by pairs of electrodes 4a and covering the electrodes with glasses 4c (see FIG. 5). In an example employed in the present embodiment, three pairs of laterally elongated electrodes 4a are lined in tandem. A larger number of pairs of electrodes 4a may be included for minutely dividing the cell into fields to be switched. Since the human eyes perceive an after image, the cell need not be divided very minutely. A required effect can still be provided. Moreover, a larger number of electrodes 4a causes an increase in cost. Besides, a control circuit and others become complex. In this example, three pairs of electrodes are therefore included.

Figures 3A, 3B:
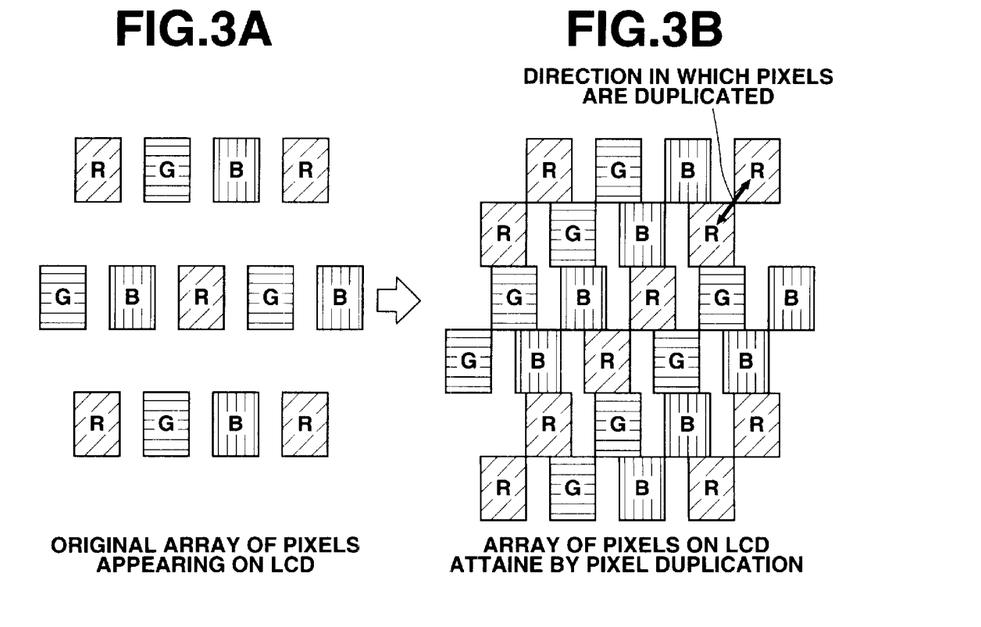
FIG. 3A shows the array of pixels appearing on the LCD according to the first embodiment.
FIG. 3B shows the array of pixels to be attained by pixel duplication according to the first embodiment.

The principles based on which the number of apparent pixels appearing on the LCD 3 is increased by utilizing the polarization switching liquid crystal cell 4 and birefringent plate 5 will be described with reference to FIG. 2, FIG. 3A, and FIG. 3B. FIG. 3A shows an array of pixels appearing on the LCD, while FIG. 3 shows an array of pixels to be attained by duplicating pixels.

As shown in FIG. 2, light emitted from the LCD 3 has passed through the liquid crystal in the LCD and has therefore already been polarized in one direction. In the example shown in FIG. 2, for example, the light has been polarized in a vertical direction.

The light emitted from the LCD 3 enters the polarization switching liquid crystal cell 4. The direction of polarization for the light is varied depending on the controlled state of each portion composed-of a pair of electrodes 4a.

In the example shown in FIG. 2, the upper electrodes 4a allow light to pass through them as it is without varying the polarized state of the light. The middle and lower electrodes 4a vary the polarized state of light to produce p-polarized light.

By the way, the birefringent plate 5 allows, as illustrated, p-polarized light to pass as it is, and emits s-polarized light slightly downward obliquely (see FIG. 3A and FIG. 3B). Light having passed through the portion composed of the upper electrodes 4a has the optical path thereof varied. A position to which the light is emitted is therefore shifted. Light having passed through the middle and lower electrodes 4a are passed as they are with the optical paths thereof left unchanged.

Owing to the foregoing structure, the array of pixels appearing on an LCD as shown in FIG. 3A is changed to the one shown in FIG. 3B after the pixels are duplicated by the polarization switching liquid crystal cell 4 and birefringent plate 5.

To be more specific, the second leftmost green (G) on the uppermost row shown in FIG. 3A is duplicated at an intermediate position between its original position and the position of the leftmost green (G) on the middle row. The other pixels are duplicated in the same manner. The array of pixels on the LCD attained by performing pixel duplication is therefore as shown in FIG. 3B. Consequently, the total number of pixels including pixels constituting an even field and those constituting an odd field is apparently doubled.

Figures 4A, 4B:
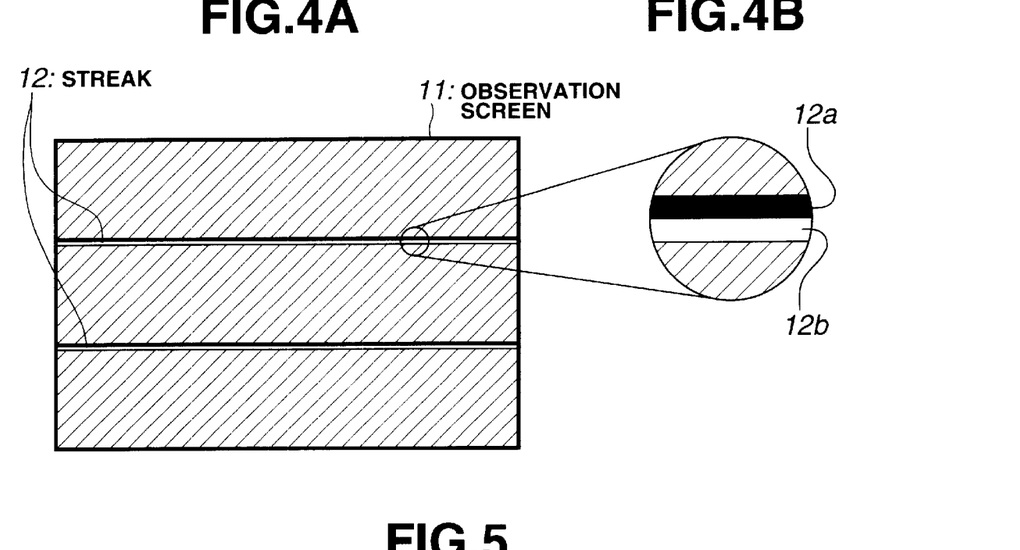
FIG. 4A shows a screen on which streaks are observed after pixels are duplicated as shown in FIG. 2.
FIG. 4B is an enlarged diagram showing part of the observation screen shown in FIG. 4A.

FIG. 4A shows streaks to be observed on a screen when pixels have been duplicated as shown in FIG. 2. FIG. 4B is an enlarged view showing part of the observation screen shown in FIG. 4A.

After pixels are duplicated as mentioned above, if no measure is taken, horizontal streaks like the ones shown in FIG. 4A appear at the same positions as gaps among the electrodes 4a on the observation screen 11. This has been demonstrated experimentally by the present applicant. In this example, as mentioned above, since three pairs of electrodes 4a are included, streaks 12 are observed at two positions among the pairs.

The streaks 12 are, as detailed in FIG. 4B, each composed of a black horizontal line 12a and a white horizontal line 12b adjoining the black line.

Conceivable reasons why the streaks 12, each composed of the black and white horizontal lines 12a and 12b, are observed will be described in conjunction with FIG. 5. FIG. 5 laterally shows paths along which rays travel after directions of polarization are switched.

The states of rays passing through each portion composed of electrodes 4a are switched field by field according to whether a voltage has been applied to the electrodes 4a. In one of the states, the rays track the optical path indicated with solid lines in FIG. 5. In the other state, the rays track the optical path indicated with alternate long and two short dashes lines.

By the way, a gap between the adjoining pairs of electrodes 4a is, for example, about 13 μm wide. For rays passing through the gap, directions of polarization are not changed field by field. The rays therefore pass through the birefringent plate 5 along the same path all the time. After light passes through the birefringent plate 5, since no rays travel through one portion of the gap between the adjoining pairs of electrodes 4a, an area in the screen is seen dark. Moreover, since rays overlap while travelling through the other portion of the gap, an area adjoining the area is seen bright. That is why the black and white horizontal lines 12a and 12b appear.

Figure 6:
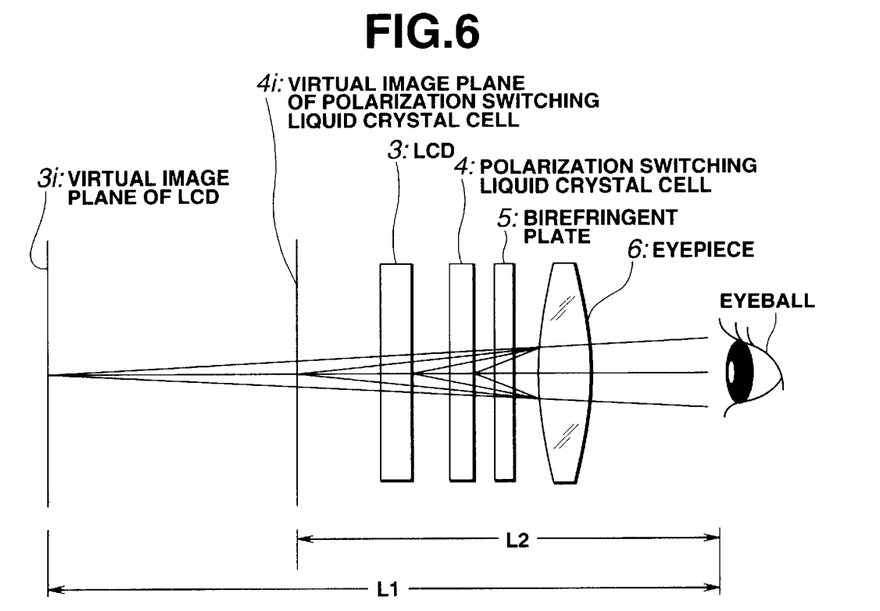
FIG. 6 shows the relationships among the positions of the LCD, an optical system, and the virtual image plane of the LCD according to the first embodiment.

In an effort to make the foregoing streaks 12 indiscernible, the present embodiment has taken measures as described below. FIG. 6 shows the positional relationships among the LCD, the optical system, and the virtual image place of the optical system.

To begin with, assume that the distance from the eyeball to the virtual image plane 3$i$ of the LCD is L1, and the distance from the eyeball to the virtual image plane 4$i$ of the polarization switching liquid crystal cell is L2. The distances are determined so that either of the relationships expressed by formulas below will be satisfied.

$$1/L2-1/L1 \geq 0.4 \text{ (D)} \quad \text{[Formula 1]}$$

$$L2 \leq 200 \text{ (mm)} \quad \text{[Formula 2]}$$

where D in formula 1 stands for diopter.

The condition expressed by formula 1 is a condition that must be satisfied in order to make the streaks 12 out of focus and indiscernible. Specifically, the virtual image plane 3$i$ of the LCD and the virtual image plane 4$i$ of the polarization switching liquid crystal cell should be separated from each other by a certain distance or longer. This condition is satisfied when the virtual image plane 4$i$ of the polarization switching liquid crystal cell is separated from the virtual image plane 3$i$ by a distance equal to or longer than a depth of field.

The focal depth ΔD of the human eyes is expressed by formula 3 below.

$$\Delta D = \delta D e / P$$

where δ denotes a blurring detection ability, P denotes the diameter of a pupil, and De denotes the total refractive power of the eyeballs. When 0.015 (mm), 2 (mm), and 60 (D) are assigned to δ, P, and De respectively in formula 3, the focal depth ΔD is calculated as 0.45 (D).

Incidentally, "O plus E" published by New Technology Communications, Co., Ltd. (October Issue, No. 71, P. 111, 1985) describes that the focal depth ΔD of the human eyes falls within the range of ±0.1 to ±0.43 D.

The right side of formula 1, 0.4 (D), has been determined experimentally by referencing the literature and adapting the values of the focal depth to the depth of field.

An example of arrangements satisfying the condition expressed by formula 1 will be described below.

The focal length of the eyepiece 6 is set to 25 mm (a typical example of focal lengths employed in head-mounted image display devices). The distance L1 from the eyeballs to the virtual image plane 3$i$ is set to 1000 mm (a typical example of distances employed in head-mounted image display devices). In this situation, the position of the LCD 3 exists near the eyepiece 6 away from the focal point thereof by a length calculated as follows:

$$25 \times 25/1000 = 0.625 \text{ (mm)}$$

The distance L2 from the eyeball to the virtual image 4$i$ stemming from the polarization switching liquid crystal cell is calculated based on formula 1 as 714 (mm) (=−1 (D)−0.4 (D))=−1.4(D)).

Consequently, the position of the polarization switching liquid crystal cell 4 exists ahead of the focal point thereof by a length calculated as follows:

$$25 \times 25/714 = 0.875 \text{ (mm)}$$

The distance from the LCD 3 to the polarization switching liquid crystal cell 4 should therefore be set to the value calculated as follows:

$$0.875 - 0.625 = 0.25 \text{ (mm)}$$

Moreover, a point at a close range on which the human eyes can be focused is limited. The aforesaid "O plus E" (May issue, No. 114, P. 149, 1989) describes that the closest range (near point adjustment limit) varies depending on age. The near point adjustment limit is known to vary depending on age and differ from individual to individual.

Figure 7:
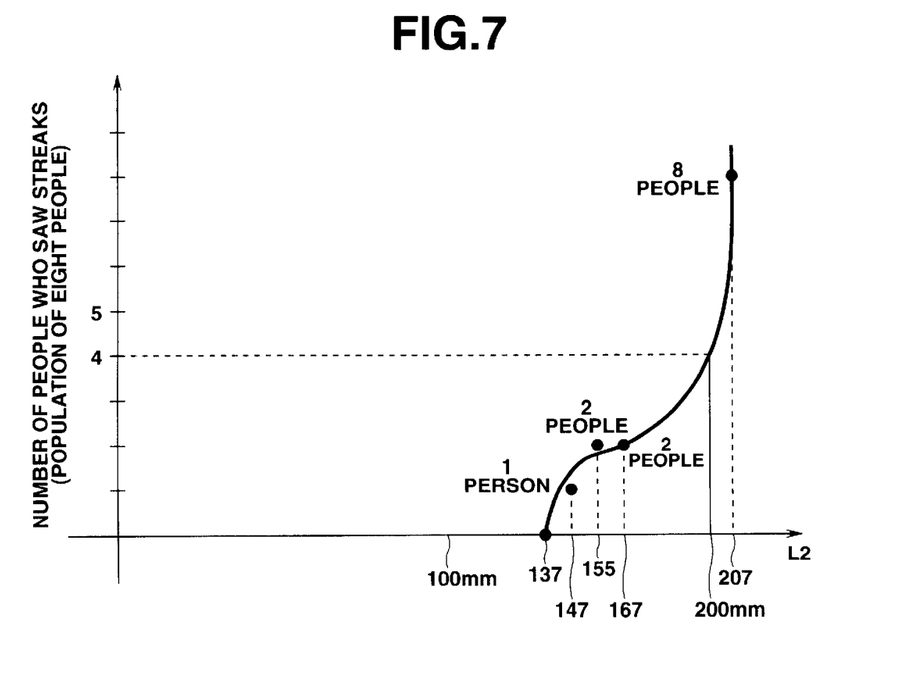
FIG. 7 is a graph indicating the results of an experiment conducted to check if steaks are seen when the position of the virtual image plane of a polarization switching liquid crystal cell has been changed according to the first embodiment.

An experiment conducted by the present applicant has provided the results graphically shown in FIG. 7. FIG. 7 is a graph indicating the results of the experiment conducted to check if streaks are seen by varying the position of the virtual image plane of the polarization switching liquid crystal cell.

FIG. 7 shows the results of the experiment conducted on a population of eight people. Specifically, the distance L1 from the eyeballs to the virtual image plane 3$i$ of the LCD was set to 1000 mm. It was checked to what millimeters L2 was set when the streaks 12 were seen. When L2 was set to approximately 200 mm, the number of people who saw the streaks 12 was a half of the population or four people.

The value of 200 mm is adopted as an index. When L2 is set to a smaller value, a larger number of people will not observe the streaks 12. The smaller value is, for example, 167 mm that is a more limited value based on the results of the experiment graphically shown in FIG. 7. The value of 167 mm is a preferable practical value.

The least distance of a distinct vision or distance at which a human beings can observe an object most distinctively is known to be about 250 mm (=4 D). When an object at the least distance of distinct vision is observed, the distance that exists outside the depth of field (about 0.4 D as mentioned above) is calculated as follows:

$$1000/(4\ 30\ 0.4) = 227 \text{ (mm)}$$

The virtual image 4$i$ stemming from the polarization switching liquid crystal cell should preferably be located at a position at a closer range than 227 mm, so that the streaks 12 will not be observed readily.

The condition expressed by formula 2 is LS≦200 mm. This value can be said to be determined based on data including the near point adjustment limit and the least distance of distinct vision while due consideration is given to practicality.

An example of arrangements meeting the condition expressed by formula 2 will be presented below.

The focal length of the eyepiece 6 is set, like the one in the aforesaid example, to a typical value of 25 mm. The distance L2 from the eyeballs to the virtual image 4$i$ stemming from the polarization switching liquid crystal cell is set to 200 mm that is the upper limit specified by formula 2. The position of the polarization switching liquid crystal cell 4 exists near the eyepiece 6 away from the focal point of the cell by a distance calculated as follows:

$$25 \times 25/200 = 3.125 \text{ (mm)}$$

Assume that the distance L1 from the eyeballs to the virtual image plane 3$i$ of the LCD is, like the one in the aforesaid example, set to 1000 mm. In this case, the position of the LCD 3 exists 0.625 mm ahead of the focal point thereof. Consequently, the distance from the LCD 3 to the polarization switching liquid crystal cell 4 should be set to the value calculated as follows:

$$3.125 - 0.625 = 2.5 \text{ (mm)}$$

Figures 8A, 8B:
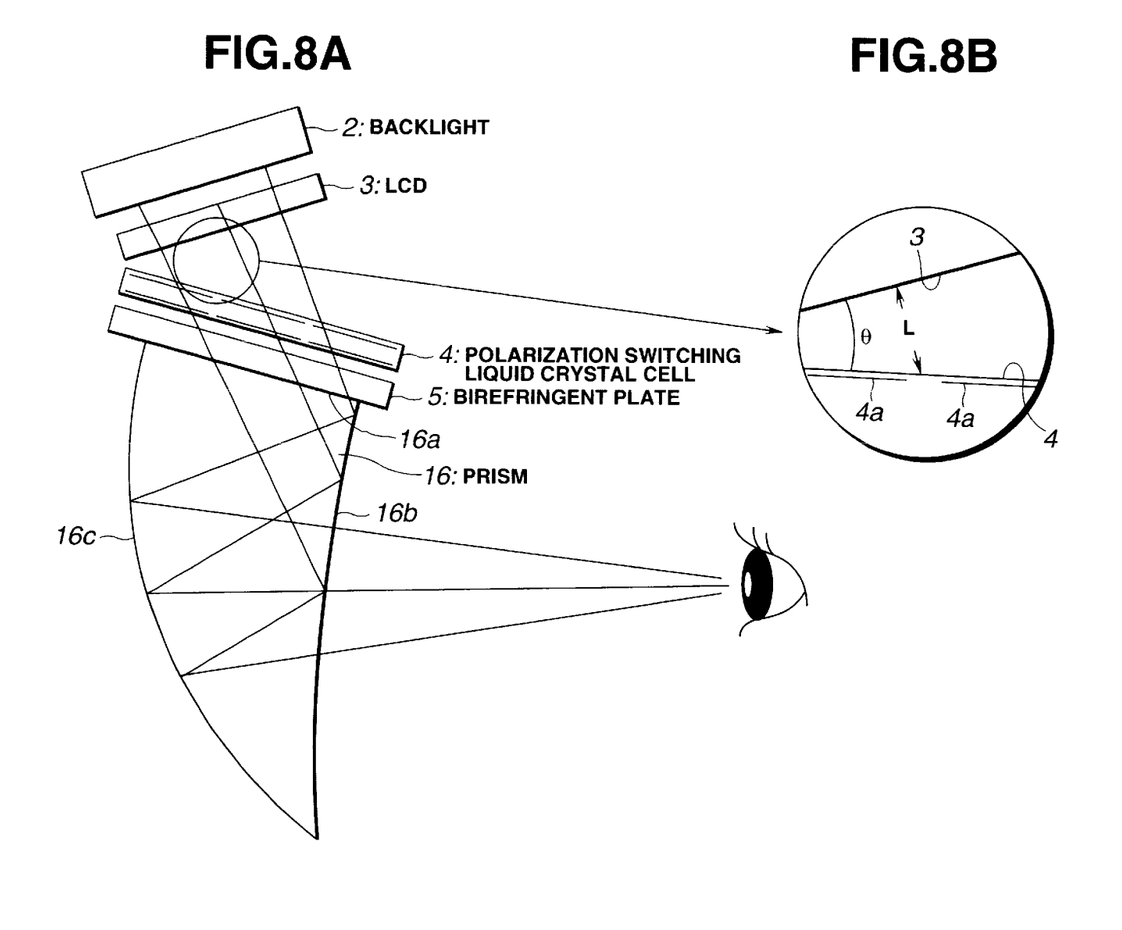
FIG. 8A laterally shows the configuration of an optical system for head-mounted image display devices realized with an eccentric optical system according to the present invention.
FIG. 8B is an enlarged view showing a major portion of the optical system shown in FIG. 8A.

FIG. 8A and FIG. 8B show an example of eccentric optical systems like the one proposed in the Japanese Unexamined Patent Publication No. 9-281430 by the present applicant. The aforesaid arrangement for making the streaks 12 indiscernible is adapted to the example. FIG. 8A and FIG. 8B laterally show the structure of an optical system for head-mounted image display devices realized with an eccentric optical system.

An image on the LCD 3 illuminated by the backlight 2 is routed to the inside of a prism 16 serving as an optical system and tilting relative to an emitting surface of the LCD 3 through an incident surface 16a thereof. The light representing the image is then reflected by a first reflecting surface 16b. Thereafter, the light is reflected from a second reflecting surface 16c that is a free-form surface, and emitted to the observer's eyeballs. The prism 16 realizes a kind of non-telecentric optical system, or in particular, an eccentric optical system having a free-form surface and being symmetric with respect to a plane.

The polarization switching liquid crystal cell 4 and birefringent plate 5 are, as shown in FIG. 8A and FIG. 8B, positioned substantially parallel to the incident surface 16a of the prism 16. In other words, the polarization switching liquid crystal cell 4 and birefringent plate 5 are positioned at a predetermined angle θ with respect to the emitting surface of the LCD 3.

The distance L from the emitting surface of the LCD 3 to the gap between a pair of electrodes 4a located closest to the emitting surface of the LCD 3 among all the electrodes in the polarization switching liquid crystal cell 4 is thus made as long as possible. The streaks 12 will therefore be indiscernible.

A practical example of numerical values, for example, θ is set to 15° and L is set to 3.2 (mm).

According to the foregoing first embodiment, the position of a virtual image stemming from the polarization switching liquid crystal cell is found outside a depth of field within which the LCD gives an observable virtual image. When the virtual image stemming from the LCD is observed, steaks caused by the gaps among the electrodes in the polarization switching liquid crystal cell will be indiscernible. The virtual image will be able to be observed distinctly.

Moreover, the distance from the eyeballs to the virtual image plane of the polarization switching liquid crystal cell may be set to 200 mm or less. In this case, the virtual image plane is located outside the depth of field limited by the least distance of distinct vision for human beings. From the beginning of the range at which an observer tries to observe a virtual image stemming from an LCD, the observer will be unaware of the presence of the aforesaid streaks.

A prism realizing an eccentric optical system may be used as an eyepiece for magnifying an image. The position of the polarization switching liquid crystal cell is determined by making the most of the arrangement that the incident surface of the prism is tilted. Consequently, a placement space required for placing the prism can be made as small as possible.

Figure 9:
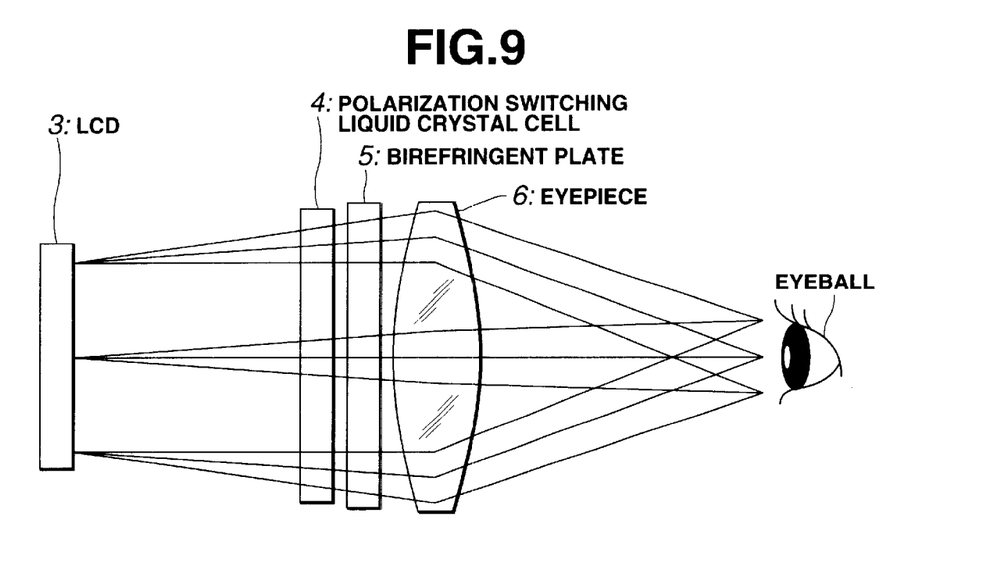
FIG. 9 shows optical paths along which rays coming from an LCD pass according to the second embodiment of the present invention.

FIG. 9 to FIG. 15 shows the second embodiment of the present invention. FIG. 9 shows optical paths along which rays coming from the LCD travel. In the second embodiment, components identical to those of the first embodiment will not be described but differences from the first embodiment will be described mainly.

As shown in FIG. 9, light representing the center of an image on the LCD 3 passes substantially through the center of the polarization switching liquid crystal cell 4. Thereafter, the light enters substantially vertically the center of the birefringent plate 5, and reaches the eyeballs through the eyepiece 6. Light representing the perimeter of the image on the LCD 3 enters slightly obliquely the perimeter of the birefringent plate 5.

Figure 10A:
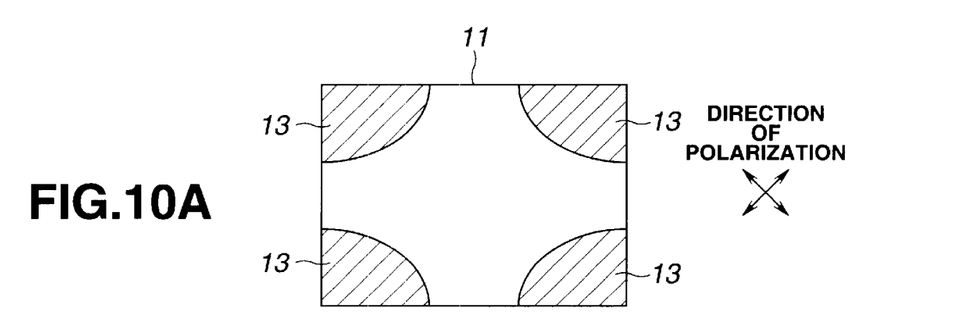
FIG. 10A shows fields in which flickers are observed when the direction of polarization is set to obliquely orthogonal directions according to the second embodiment of the present invention.
Figure 10B:
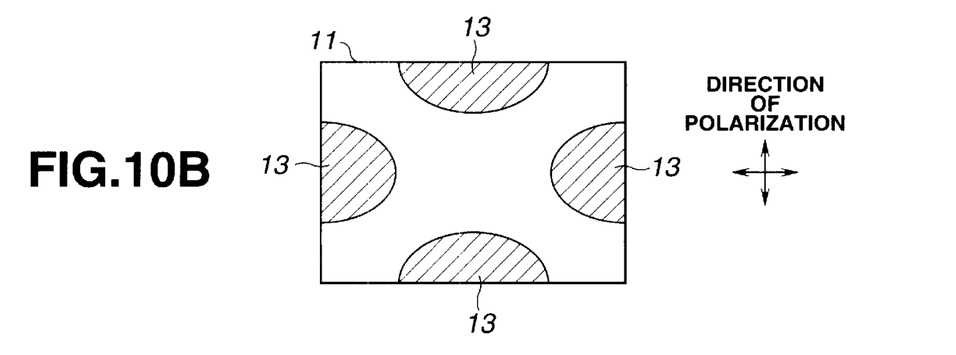
FIG. 10B shows fields in which flickers are observed when the direction of polarization is set to vertical and lateral directions according to the second embodiment.

At this time, if the direction of polarization is switched field by field by the polarization switching liquid crystal cell 4, as shown in FIG. 10A and FIG. 10B, flickers are observed on the perimeter of a screen. This has been demonstrated experimentally by the present applicant. FIG. 10A shows fields in which flickers are observed when the direction of polarization is set to obliquely orthogonal directions. FIG. 10B shows fields in which flickers are observed when the direction of polarization is set to vertical and lateral directions.

Referring to FIG. 10A, it is seen that when the direction of polarization for light is set to two orthogonal directions that extend substantially askew at 45°, four corners of the observation screen 11 are fields 13 in which flickers are observed.

Referring to FIG. 10B, it is seen that when the direction of polarization for light is set to two orthogonal directions of vertical and lateral directions, the center portions on four sides of the observation screen 11 are the fields 13 in which flickers are observed.

The modes of the polarization switching liquid crystal cell 4 are, as mentioned above, switched field by field. In one of the modes, polarized rays emitted from the LCD 3 are passed with the polarized state thereof unchanged. In the other mode, the direction of polarization is changed to orthogonal directions in which the rays are passed.

Light emitted from the perimeter of the LCD 3 and entering obliquely the birefringent plate 5 is divided into a p-wave containing a component oriented in the direction of the normal on the incident plane and an s-wave not containing the component.

Figure 11:
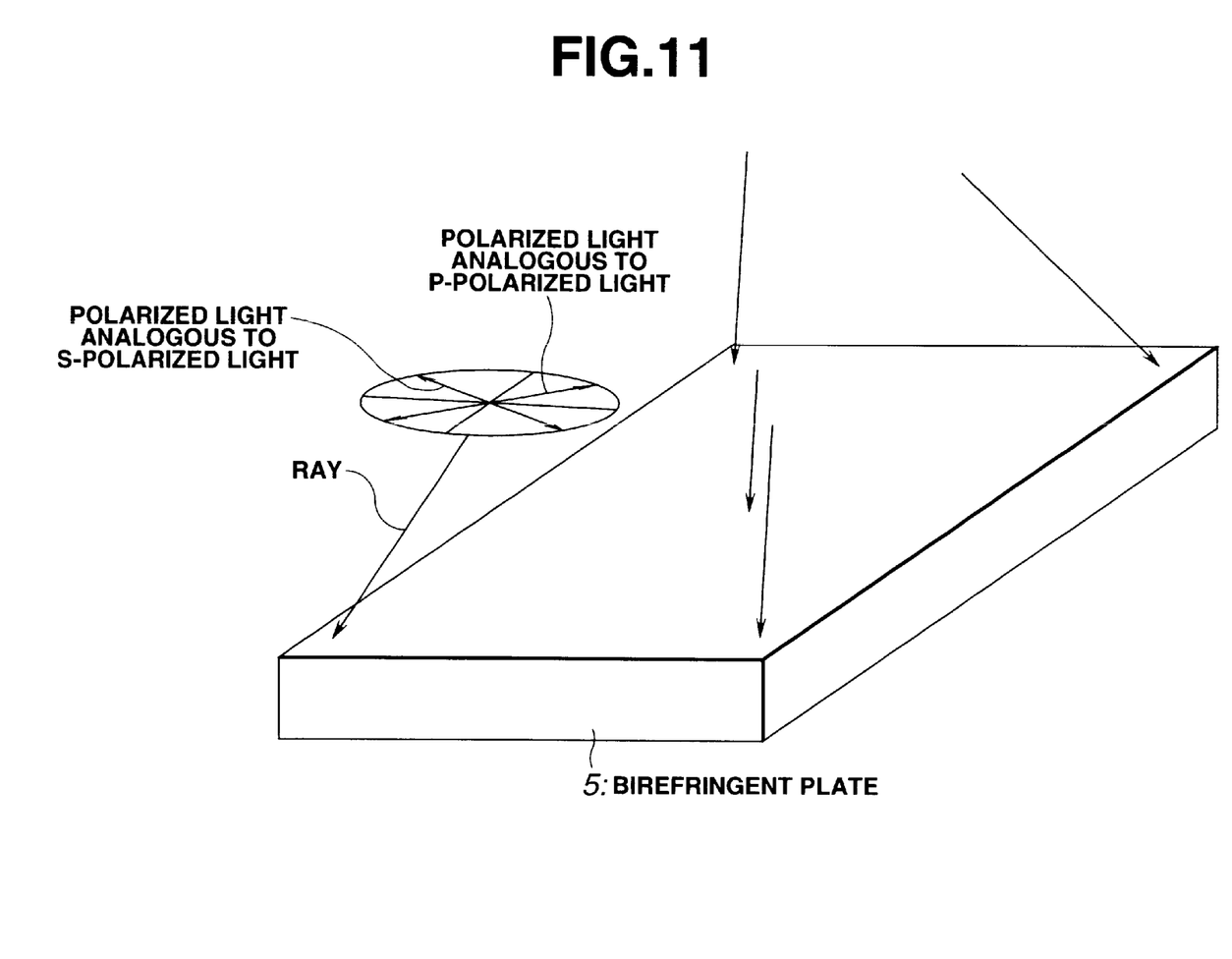
FIG. 11 is a perspective view showing polarized rays analogous to p-polarized light and polarized rays analogous to s-polarized light to which light incident on the perimeter of a birefringent plate is changed.

FIG. 11 is a perspective view indicating that when the direction of polarization is set to the directions shown in FIG. 10A, rays incident on the perimeter of the birefringent plate are changed to polarized rays analogous to p-polarized light and polarized rays analogous to s-polarized light.

The polarized ray analogous to p-polarized light is a ray containing a larger number of p-wave components out of two kinds of polarized rays travelling in two orthogonal directions. The ray analogous to s-polarized light is a ray containing a larger number of s-wave components. In the example shown in FIG. 11, the polarized ray analogous to p-polarized light consists substantially of p-wave components, and the polarized ray analogous to s-polarized light consists substantially of s-wave components.

Figure 12:
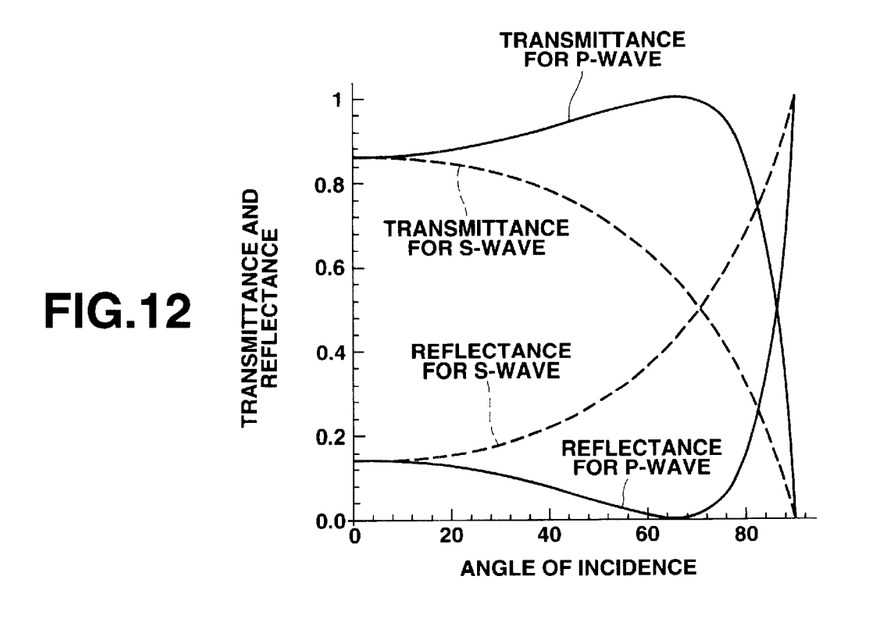
FIG. 12 is a graph indicating the dependency of the transmittance and reflectance of the birefringent plate, which exhibits a refractive index of 2.2, on an angle of incidence according to the second embodiment.

The birefringent plate 5 exhibits the transmission and reflection characteristics shown in FIG. 12 relative to an angle of incidence. FIG. 12 is a graph showing the dependency of the transmittance and reflectance of a birefringent plate, which exhibits a refractive index of 2.2, on an angle of incidence.

Lithium niobate (LiNbO3) is used as a material made into the birefringent plate 5. The lithium niobate has the merit of a high double refractive index. The birefringent plate can therefore be made thin. Cost-wise, the lithium niobate is relatively inexpensive.

When rays vertically enter an incident surface (the angle of incidence is θ), the transmittances for a p-wave and s-wave are the same as each other. As the angle of incidence increases, the transmittance for the p-wave rises gradually, while the transmittance for the s-wave falls gradually. Consequently, there arises a difference between the transmittances for the p-wave and s-wave. Even if the angle of incidence is held the same, every time directions of polarization are switched by the polarization switching liquid crystal cell 4, an amount of transmitted light increases or decreases. This causes flickers to be observed by an observer.

For example, the angle of incidence is 38°. At this time, the reflectance for the s-wave is approximately 20% and the reflectance for the p-wave is approximately 6%. A change in amount of light deriving from the difference of 14% occurs at every switching of directions of polarization. The ratio of the transmittance for the p-wave to that for the s-wave is 0.94/0.8=1.175.

Figure 13:
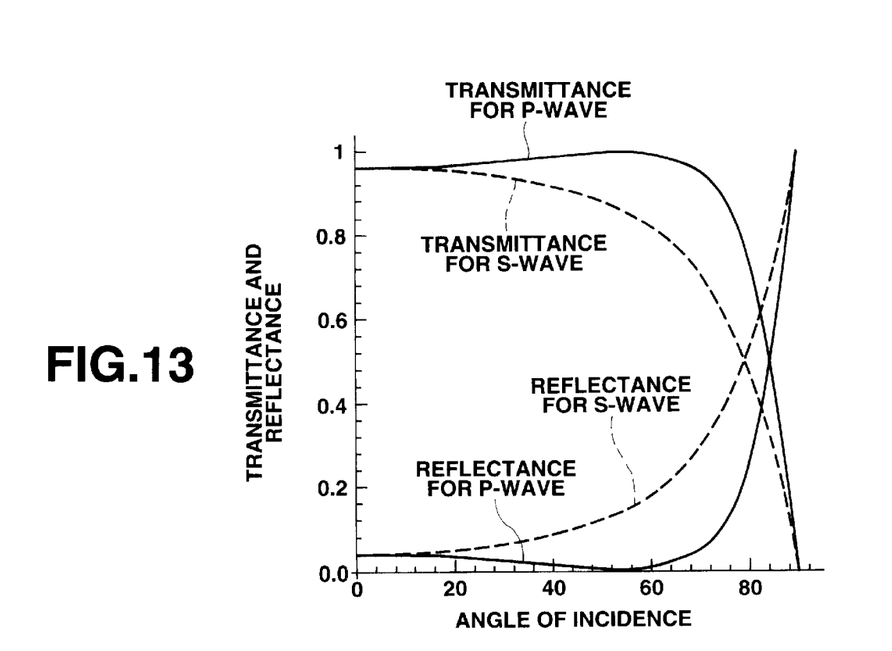
FIG. 13 is a graph indicating the dependency of the transmittance and reflectance of a glass, which exhibits a refractive index of 1.5, according to the second embodiment.

FIG. 13 is a graph indicating the dependency of the transmittance and reflectance of a glass, which exhibits a refractive index of 1.5, on an angle of incidence.

In the case of the glass, similarly to the birefringent plate 5, as the angle of incidence increases, the transmittance for the s-wave and that for the p-wave differ from each other gradually. The difference is however smaller than that in the case of the birefringent plate 5.

For example, when the angle of incidence is 38°, the reflectance for the s-wave is approximately 8% and that for the p-wave is approximately 2%. The difference between the reflectances is 6%. The ratio of the transmittance for the p-wave to that for the s-wave is 0.98/0.92=1.065.

Figure 14A:
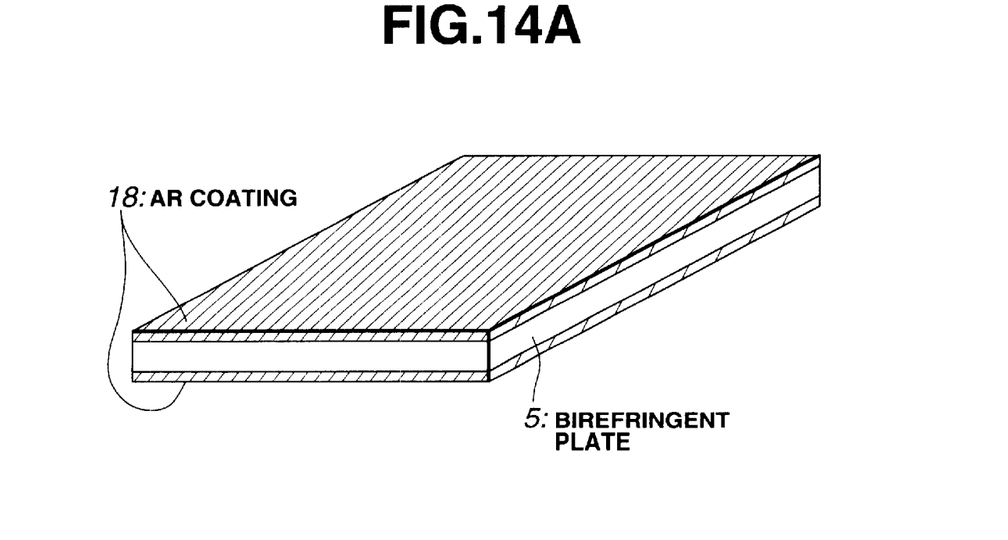
FIG. 14A is a perspective view showing the birefringent plate having both surfaces thereof coated with an anti-reflective coating according to the second embodiment.
Figure 14B:
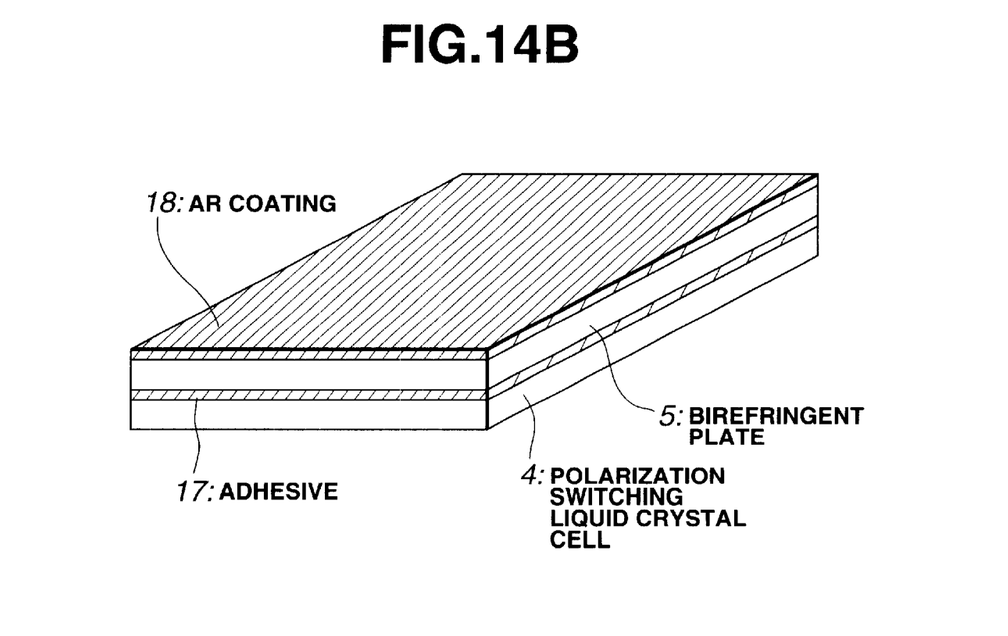
FIG. 14B is a perspective view showing the birefringent plate having one surface thereof coated with an anti-reflective coating and the other surface thereof bonded to a polarization switching liquid crystal cell using an adhesive, which exhibits a predetermined refractive index, according to the second embodiment.

For reducing the difference between the transmittances for the s-wave and p-wave, the present embodiment adopts the structure shown in FIG. 14A or FIG. 14B. FIG. 14A is a perspective view showing a birefringent plate having both the surfaces thereof coated with an anti-reflective coating. FIG. 14B is a perspective view showing a birefringent plate having one surface thereof coated with the anti-reflective coating and the other surface thereof bonded to a polarization switching liquid crystal cell using an adhesive that exhibits a predetermined refractive index.

FIG. 14A shows an example of birefringent plates in which the transmitting surfaces of the birefringent plate, or in this case, both the surfaces of the birefringent plate 5 are coated with an anti-reflective coating 18. Thus, the surfaces of the birefringent plate 5 are finished so that the ratio of transmittances for polarized light travelling in two substantially orthogonal directions will be approximated to 1.

When the surfaces of the birefringent plate 5 are coated with the anti-reflective coating 18, if an angle of incidence is, for example, 38°, the reflectance for the s-wave is approximately 1.5% and that for the p-wave is approximately 1.5%. There is no difference between the reflectances. Even when the polarization switching liquid crystal cell 4 is used to switch directions of polarization, no flickers will occur. This has been demonstrated with the results of the experiment. The ratio of the transmittance for the p-wave to that for the s-wave is 1.000.

FIG. 14B shows an example of birefringent plates in which only one surface of the birefringent plate 5 is coated with the anti-reflective coating 18 and the other surface thereof is bonded to the polarization switching liquid crystal cell 4 using an adhesive 17.

The refractive index of the adhesive 17 is set to any of 1.5 to 2.2, or an intermediate value between the refractive index of the polarization switching liquid crystal cell 4, approximately 1.5, and that of the birefringent plate 5, approximately 2.2. The transmittance of the bonded surface hardly differs between the s-wave and p-wave.

The drawback that flickers occur when light enters obliquely tends to become serious especially in the optical system shown in FIG. 8A and FIG. 8B.

Figure 15:
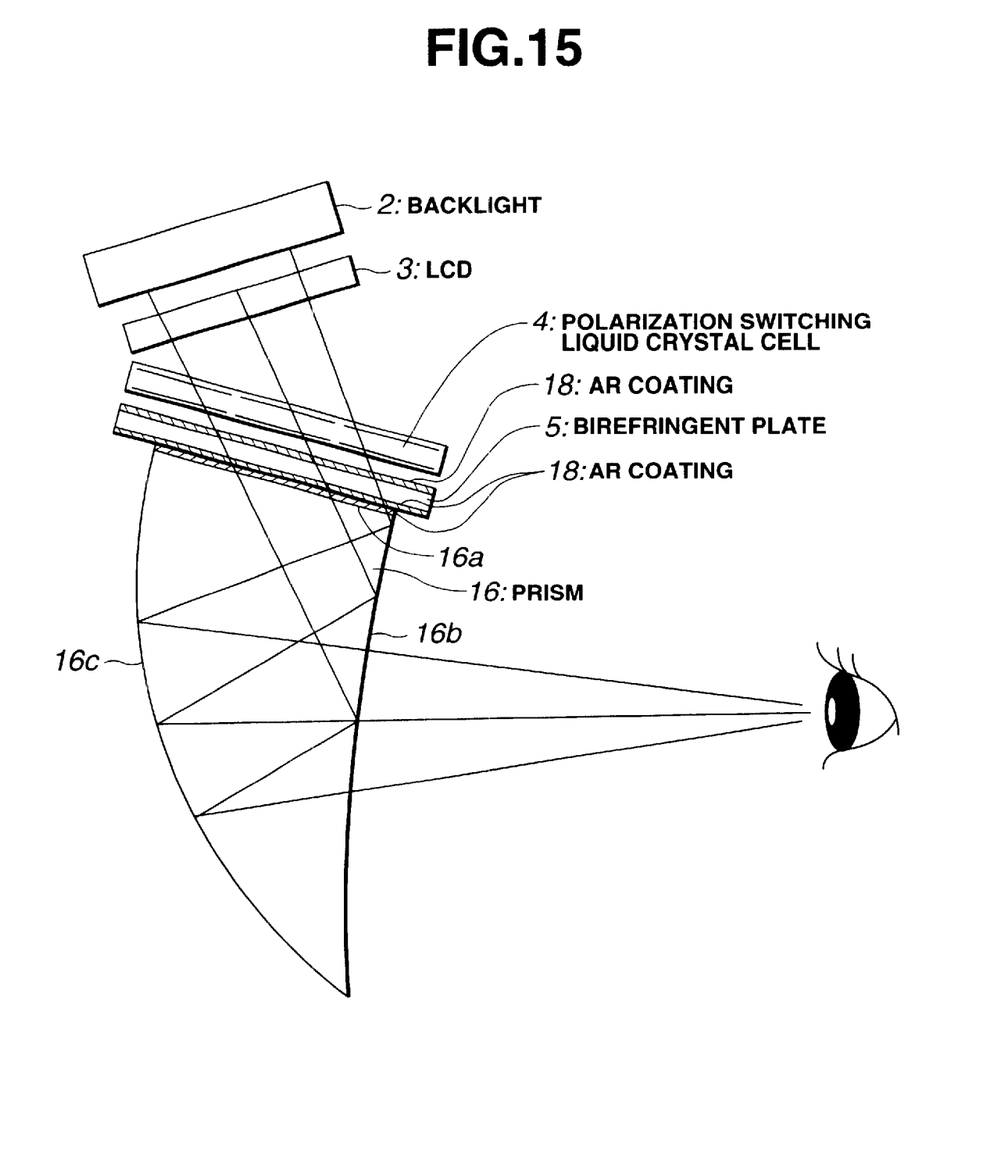
FIG. 15 laterally shows the configuration of an optical system for head-mounted image display devices which is realized with an eccentric optical system and having undergone a countermeasure against flickers according to the second embodiment.

FIG. 15 shows an example of optical systems realized by adapting the present embodiment to an optical system like the one shown in FIG. 8A and FIG. 8B. FIG. 15 laterally shows an optical system for head-mounted image display devices realized with an eccentric optical system and having undergone a countermeasure against flickers.

The optical system is, as described in conjunction with FIG. 8A and FIG. 8B, tilted relative to the emitting surface of the LCD 3 in efforts to make streaks, which are attributable to the gaps among the electrodes in the polarization switching liquid crystal cell, indiscernible.

In the optical system, the birefringent plate 5 has both the surfaces thereof coated with the anti-reflective coating 18 like the one shown in FIG. 14A. The incident surface 16a of the prism 16 is also coated with the anti-reflective coating 18.

Even a glass may be coated with the anti-reflective coating 18. This would lead to a diminished difference between the transmittances of the glass for the s-wave and p-wave.

Assuming that the angle of incidence is, similarly to that mentioned above, set to 38°, the reflectance of the glass coated with the anti-reflective coating 18 for the s-wave is approximately 1.5%, and that for the p-wave is approximately 1.0%. The difference between the reflectances is 0.5% or smaller than the aforesaid value of 6%. The ratio of the transmittance for the p-wave to that for the s-wave is 0.99/0.985=1.005. The ratio is closer to 1 than the aforesaid value of 1.065 is.

Merely by coating the surfaces of the birefringent plate 5 and the surface of the prism 16 with the anti-reflective coating 18, the ratio of the transmittance for the p-wave to that for the s-wave can be approximated to 1. Consequently, occurrence of flickers can be eliminated or alleviated.

In the example shown in FIG. 15, the birefringent plate employed has both the surfaces thereof coated with the anti-reflective coating 18. Alternatively, the birefringent plate 5 may, as shown in FIG. 14B, has one surface thereof coated with the anti-reflective coating 18 and the other surface thereof bonded to the polarization switching liquid crystal cell 4 using the adhesive 17 that exhibits a predetermined refractive index. Furthermore, one surface of the birefringent plate 5 may be bonded to the polarization switching liquid crystal cell 4 using an adhesive that exhibits a predetermined refractive index. The other surface thereof may be bonded to the incident surface 16a of the prism 16 using the adhesive that exhibits the predetermined refractive index.

According to the foregoing second embodiment, substantially identical advantages as those of the first embodiment can be provided. Furthermore, since the polarization switching liquid crystal cell polarizes light in two orthogonal directions for each field, s-wave-like light and p-wave-like light may be produced alternately. Nevertheless, since the surfaces of the birefringent plate and the surface of the prism are coated with the anti-reflective coating so that the ratio of the transmittance for the p-wave-like light to that for the s-wave-like light will be approximated to 1, flickers can be minimized.

In the present invention, it is apparent that a wide range of different working modes can be formed based on the invention without a departure from the spirit and scope of the invention. This invention will not be restricted by any specific embodiment but limited by the appended claims.

What is claimed is:
1. An image display device comprising:
    a display element having a plurality of pixel locations arrayed regularly;
    a polarization controller for controlling a plurality of electrodes incorporated therein so as to switch the direction of polarization, in which incident light coming from said display element is polarized, in units of a portion composed of electrodes and to emit resultant light;

an optical path controller, located on the optical path of light emitted from said polarization controller, for varying the optical path depending on the direction of polarization; and an optical system for magnifying light that has passed through said optical path controller and represents an image displayed on said display element, wherein said display element and said polarization controller are positioned so that the position of a virtual image stemming from said display element and the position of a virtual image stemming from said electrodes in said polarization controller are separated from each other by a distance equal to or longer than a depth of field, the virtual images being produced by said optical system.

2. An image display device according to claim 1, wherein the depth of field corresponding to the distance, by which the position of the virtual image stemming from said display element and the position of the virtual image stemming from said electrodes in said polarization controller are separated from each other, is set to 0.4 diopter or more.

3. An image display device comprising:

a display element having a plurality of pixel locations arrayed regularly;

a polarization control means for controlling a plurality of electrodes incorporated therein so as to switch the direction of polarization in which incident light coming from said display element is polarized, in units of a portion composed of electrodes and to emit resultant light;

an optical path control means located on the optical path of light emitted from said polarization control means for varying the optical path depending on the direction of polarization; and an optical system for magnifying light that has passed through said optical path control means and represents an image on said display element, wherein said polarization control means is positioned so that a near point adjustment limit or the shortest distance at which the human eyes can come into focus will be between the position of a virtual image stemming from said polarization control means and the position of a virtual image stemming from said display element.

4. An image display device according to claim 3, wherein the near point adjustment limit for the human eyes is set to 200 mm.

5. An image display device according to claim 3, wherein the near point adjustment limit for the human eyes is set to 167 mm.

6. An image display device comprising:

a display element having a plurality of pixel locations arrayed regularly;

a polarization controller for controlling a plurality of electrodes incorporated therein so as to switch the direction of polarization, in which incident light coming from said display element is polarized, in units of a portion composed of electrodes;

an optical path controller, located on the optical path of light emitted from said polarization controller, for varying the optical path depending on the direction of polarization; and an eccentric optical system for magnifying light that has passed through said optical path controller and represents an image on said display element, wherein said polarization controller is tilted relative to said display element.

7. An image display device comprising:

a display element having a plurality of pixel locations arrayed regularly;

a polarization switching controller for switching the direction of polarization, in which incident light coming from said display element is polarized, to two substantially orthogonal directions and emitting resultant light;

a birefringent optical element, located on the optical path of light emitted from said polarization switching controller, for varying the optical path depending on the direction of polarization; and an optical systems for magnifying light that has passed through said birefringent optical element and represents an image on said display element, wherein at least part of the surfaces of said birefringent optical element is finished so that the ratio of transmittances of polarized light emitted from said polarization switching controller and traveling in the two substantially orthogonal directions will be approximated to 1.

8. An image display device according to claim 7, wherein the surface finishing is application of an anti-reflective coating.

* * * * *